(12) United States Patent
Pipitone

(10) Patent No.: US 10,562,191 B2
(45) Date of Patent: Feb. 18, 2020

(54) METHOD OF CONTROLLING DEVICES WITH SENSATION OF APPLIED FORCE

(71) Applicant: Robomotive Laboratories LLC, Cincinnati, OH (US)

(72) Inventor: Brett J. Pipitone, Cincinnati, OH (US)

(73) Assignee: Robomotive Laboratories LLC, Cincinnati, OH (US)

( * ) Notice: Subject to any disclaimer, the term of this patent is extended or adjusted under 35 U.S.C. 154(b) by 54 days.

(21) Appl. No.: 15/348,709

(22) Filed: Nov. 10, 2016

(65) Prior Publication Data

US 2017/0182660 A1 Jun. 29, 2017

Related U.S. Application Data

(60) Provisional application No. 62/272,509, filed on Dec. 29, 2015.

(51) Int. Cl.

| G05B 15/00 | (2006.01) |
|---|---|
| G05B 19/00 | (2006.01) |
| B25J 13/08 | (2006.01) |
| B25J 9/16 | (2006.01) |
| G05B 19/427 | (2006.01) |
| B25J 13/02 | (2006.01) |

(52) U.S. Cl.
CPC .......... *B25J 13/088* (2013.01); *B25J 9/1689* (2013.01); *B25J 13/02* (2013.01); *B25J 13/085* (2013.01); *G05B 19/427* (2013.01); *G05B 2219/40138* (2013.01)

(58) Field of Classification Search
CPC ........ B25J 13/02; B25J 13/085; B25J 13/088; B25J 9/1689; G05B 19/427; G05B 2219/40138
See application file for complete search history.

(56) References Cited

U.S. PATENT DOCUMENTS

| 6,385,509 | B2 | 5/2002 | Das et al. | |
|---|---|---|---|---|
| 6,594,552 | B1* | 7/2003 | Nowlin | G16H 50/50 700/260 |
| 8,374,723 | B2* | 2/2013 | Zhao | B25J 9/1689 318/568.11 |
| 9,788,909 | B2* | 10/2017 | Larkin | B25J 9/1671 |
| 10,226,869 | B2* | 3/2019 | Chizeck | B25J 9/1689 |
| 2002/0120188 | A1* | 8/2002 | Brock | A61B 5/0086 600/407 |

(Continued)

OTHER PUBLICATIONS

ISA International Search Report (dated Mar. 17, 2017).

*Primary Examiner* — Harry Y Oh
(74) *Attorney, Agent, or Firm* — Frederick H. Gribbell; Russell F. Gribbell

(57) ABSTRACT

The inventive technology eliminates the need for force sensors on a robotic manipulator while also improving feel by incorporating force sensors on the corresponding robotic input device. Position of the manipulator is used to determine positioning of the input device; therefore, rather than manipulator position lagging the input device position (as in conventional robotic systems), the opposite is true, so that input device position lags manipulator position. Through a combination of input device force control and manipulator position feedback, a sense of feel is achieved through use of an "effort sensor" mounted at a "control point" on the input device and use of a "position feedback force control" scheme.

15 Claims, 15 Drawing Sheets

(56) References Cited

U.S. PATENT DOCUMENTS

| | | | |
|---|---|---|---|
| 2003/0195664 A1* | 10/2003 | Nowlin | B25J 9/1689 700/260 |
| 2008/0046122 A1* | 2/2008 | Manzo | A61B 1/00149 700/245 |
| 2009/0024142 A1* | 1/2009 | Ruiz Morales | B25J 9/041 606/130 |
| 2009/0248038 A1* | 10/2009 | Blumenkranz | B25J 13/085 606/130 |
| 2012/0109379 A1* | 5/2012 | Abdallah | B25J 9/1045 700/260 |
| 2014/0046128 A1* | 2/2014 | Lee | A61B 1/00009 600/102 |
| 2014/0156074 A1* | 6/2014 | Seo | B25J 3/04 700/257 |
| 2014/0195052 A1* | 7/2014 | Tsusaka | B25J 3/04 700/257 |
| 2014/0316430 A1* | 10/2014 | Hourtash | A61B 34/37 606/130 |
| 2014/0350726 A1* | 11/2014 | Tsusaka | B25J 13/02 700/257 |
| 2015/0018841 A1* | 1/2015 | Seo | A61B 34/77 606/130 |
| 2015/0066051 A1* | 3/2015 | Kwon | B25J 3/04 606/130 |
| 2015/0073596 A1* | 3/2015 | Fudaba | B25J 3/04 700/259 |
| 2016/0279788 A1* | 9/2016 | Kanaoka | B25J 3/04 |
| 2017/0020617 A1* | 1/2017 | Weir | A61B 34/30 |
| 2017/0055981 A1* | 3/2017 | Vendely | A61B 42/00 |
| 2017/0095301 A1* | 4/2017 | Brisson | A61B 34/35 |
| 2017/0112580 A1* | 4/2017 | Griffiths | B25J 19/0004 |
| 2018/0263714 A1* | 9/2018 | Kostrzewski | A61B 34/20 |
| 2019/0254762 A1* | 8/2019 | Overmyer | A61B 17/00234 |
| 2019/0274716 A1* | 9/2019 | Nott | A61B 34/37 |

* cited by examiner

METHOD OF CONTROLLING DEVICES WITH SENSATION OF APPLIED FORCE

CROSS-REFERENCE TO RELATED APPLICATIONS

The present application claims priority to provisional patent application Ser. No. 62/272,509, titled "METHOD OF CONTROLLING DEVICES WITH SENSATION OF APPLIED FORCE," filed on Dec. 29, 2015.

TECHNICAL FIELD

The general purpose of the technology disclosed herein is to control an open loop manipulator with a closed loop operator input device, typically using an electronic controller. The manipulator consists of at least one degree of freedom of translational or rotational motion, a device for applying force (or other type of effort) around or along the degree of freedom, and a rotational or linear position sensor.

The input device consists of the same number of degrees of freedom as the manipulator, but may be rotational or translational regardless of the configuration of the manipulator. In one embodiment, the input device includes a mechanism to control the position of each degree of freedom, one or two force sensors for at least one degree of freedom, and a rotational or linear position sensor on each degree of freedom. The force sensor(s) detect force in one direction of motion of the degree of freedom when a single force sensor is installed, or in both directions when two force sensors are installed.

The electronic controller reads the position sensors of each degree of freedom of the manipulator and input device and commands the input device to the position indicated by the manipulator in a "Position Feedback" arrangement. Any appropriate control method can be used, such as bang-bang, differential control, or PID. The controller also reads the force sensor(s) from the input device and applies a corresponding force and direction to the manipulator. In this way "position feedback force control" is achieved. The force applied to the manipulator need not be linearly related to the input force on the input device.

In another embodiment, the input device uses at least one torque sensor, rather than a force sensor, because the controlled input direction is rotational rather than linear. Therefore, the type of input sensor mounted to the input device will sometimes be referred to herein as an "effort sensor," which could be a force sensor, torque sensor, pressure sensor, temperature sensor, acoustic sensor, light sensitive device (for measuring electromagnetic energy or radiation), vibration sensor, shock sensor, gravity sensor, and the like.

In yet another alternative embodiment, one or more degrees of freedom of position feedback force control may be combined with traditional open loop position control, to add capability while minimizing complexity. An embodiment is described below wherein a robot arm is provided in which the operator can position the gripper in space using open loop position control, while the gripper controller utilizes position feedback force control.

It will be understood that all references herein to the phrase "force control" also have the meaning of "effort control," in which a different type of physical phenomena, such as torque or pressure, can be substituted for "force;" therefore, the terms "force control" or "force controller" also include controlling other types of physical effort. It will also be understood that, as used herein, the phrase "degree of freedom" often refers to a physical structure of a robotic manipulator or a robotic input device, in which having a single degree of freedom means that there is a structure that can move in that single degree of freedom. If there is, for example, a robotic input device having "at least one degree of freedom," that means there is a single structure that can move in at least that one degree of freedom, or there are multiple structures that each can move in at least one degree of freedom.

STATEMENT REGARDING FEDERALLY SPONSORED RESEARCH OR DEVELOPMENT

None.

BACKGROUND

Many conventional, state of the art robotic force feedback systems rely on at least one force sensor mounted on a robot end effector unit using a type of positioning device, such as a motor and encoder unit, and using a device for applying force a robotic input device having at least one degree of freedom e to an interface device. An example of such a conventional robotic system is illustrated in FIGS. 1 and 2, in which a robot end effector unit, designated by the reference numeral 1, includes a pair of motors 3 and encoders 4, mounted to a gripper-style robot end effector 1. Both distal ends of the gripper "claws" include a force sensor 2. A corresponding interface device, generally designated by the reference numeral 6, includes a pair of handles 9, which pivot at two hinge axes. A motor 7 and encoder 8 is located at each hinge axis. Some type of electronic control system (not shown) is typically included in this conventional robotic system.

Position of the gripper "claws" is controlled through complicated control algorithms utilizing position sensors on both the robot end effector 1 and the interface device 6. These position sensors comprise the encoders 4 on one unit, and the encoders 8 on the other unit. In situations where force sensors are not used, force is generally estimated through the difference between the measured positions of the robot end effector and the interface device, or using an indirect means such as robot end effector motor current. This position control scheme is commonly known as a "force feedback" scheme.

U.S. Pat. No. 6,385,509 discloses an example of the force feedback robot manipulator control scheme discussed above.

SUMMARY

Accordingly, it is an advantage to provide a robotic position feedback, force (or effort) control system to manipulate materials without direct contact, using a robotic user input device to control a robotic manipulator.

It is another advantage to provide a robotic control system in which a robotic manipulator is provided with at least one position sensor, but no force sensor (manipulator force is neither measured nor estimated), and a robotic input device is provided with at least one "effort" sensor at a "control point" (or a "control area") along with at least one position sensor, so that the "effort" (such as a force or a torque) that is applied by a human user at the input device control point is used as a control input to the system controller.

It is yet another advantage to provide a robotic control system in which a robotic manipulator is provided with at least one position sensor, but no force sensor (manipulator force is neither measured nor estimated), and a robotic input device is provided with at least one "effort" sensor at a "control point" (or a "control area") along with at least one position sensor, in which position of the manipulator is used to determine positioning of the input device, using a combination of input device force (or effort) control and manipulator position feedback, to create a sense of feel by use of the effort sensor at the input device and by use of various positions sensors on both units.

It is still another advantage to provide a robotic control system in which a robotic manipulator is provided with at least one position sensor, but no force sensor (manipulator force is neither measured nor estimated), and a robotic input device is provided with at least one "effort" sensor at a "control point" (or a "control area") along with at least one position sensor, and, rather than manipulator position lagging the input device position (as in conventional systems), the opposite is true, so that input device position lags manipulator position.

Additional advantages and other novel features will be set forth in part in the description that follows and in part will become apparent to those skilled in the art upon examination of the following or may be learned with the practice of the technology disclosed herein.

To achieve the foregoing and other advantages, and in accordance with one aspect, a robotic control system is provided, which comprises: (a) a robotic manipulator having at least one position sensor, and at least one actuator, such as a motor, that controls a position of at least one movable physical member; (b) a robotic input device having at least one position sensor, at least one actuator, such as a motor, that controls a position of at least one movable physical member proximal to a control point, and an effort sensor located proximal to the control point; and (c) a controller with a processing circuit that is configured to execute: (i) a position feedback scheme for controlling the input device based upon inputs from both the input device and the manipulator, and (ii) an effort controller scheme for controlling the manipulator based upon inputs from the input device and optionally the manipulator.

In accordance with another aspect, a robotic control system is provided, which comprises: (a) a robotic manipulator having at least one degree of freedom of motion, a device for applying a physical effort around or along the degree of freedom, and a position sensor; (b) a robotic input device having at least one degree of freedom with a mechanism to control the position of each degree of freedom, at least one effort sensor for at least one degree of freedom, and a position sensor on at least one degree of freedom, or on each degree of freedom; and (c) a controller that reads the position sensors of each degree of freedom of the manipulator and input device and commands the input device to a desired position as indicated by the manipulator.

In accordance with yet another aspect, a robotic control system is provided, which comprises: (a) a robotic manipulator having at least one first position sensor, and at least one first actuator that controls a position of at least one first movable physical member; (b) a robotic input device having at least one second position sensor, at least one second actuator that controls a position of at least one second movable physical member proximal to a control point, and an effort sensor located proximal to the control point; and (c) a system controller having a processing circuit, a memory circuit, and an interface circuit for communicating signals with (i) the robotic manipulator, and (ii) the robotic input device; wherein: the processing circuit is configured to execute: (i) a position feedback scheme for controlling the robotic input device based upon inputs from both the robotic input device and the robotic manipulator, and (ii) an effort controller scheme for controlling the robotic manipulator based upon inputs from the robotic input device.

In accordance with still another aspect, a robotic control system is provided, which comprises: (a) a robotic manipulator having at least one degree of freedom of motion, at least one first position sensor, and an actuator for applying a physical effort about the at least one degree of freedom; (b) a robotic input device having at least one degree of freedom with a mechanism to control the position of each degree of freedom, at least one effort sensor for at least one degree of freedom, and at least one second position sensor for at least one degree of freedom; and (c) a system controller having a processing circuit, a memory circuit, and an interface circuit for communicating signals with (i) the robotic manipulator, and (ii) the robotic input device; wherein: the system controller reads the at least one first position sensor of the at least one degree of freedom of the robotic manipulator and reads the at least one second position sensor of the at least one degree of freedom of the robotic input device, and commands the robotic input device to a desired position as indicated by the robotic manipulator.

In accordance with a further aspect, a robotic control system is provided, which comprises: (a) a virtual robotic manipulator having at least one virtual position sensor, and at least one virtual actuator that controls a virtual position of at least one movable virtual member, the virtual actuator including a user input device for use by a human user; (b) a robotic input device having at least one physical position sensor, at least one actuator that controls a position of at least one movable physical member proximal to a control point, and an effort sensor located proximal to the control point; and (c) a system controller having a processing circuit, a memory circuit, a display monitor, and an interface circuit for communicating signals with (i) the user input device of the virtual robotic manipulator, and (ii) the robotic input device; wherein: the processing circuit is configured to execute: (i) a position feedback scheme for controlling the robotic input device based upon inputs from both the robotic input device and the virtual robotic manipulator, and (ii) an effort controller scheme for controlling the virtual robotic manipulator based upon inputs from the robotic input device.

Still other advantages will become apparent to those skilled in this art from the following description and drawings wherein there is described and shown a preferred embodiment in one of the best modes contemplated for carrying out the technology. As will be realized, the technology disclosed herein is capable of other different embodiments, and its several details are capable of modification in various, obvious aspects all without departing from its principles. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the technology disclosed herein, and together with the description and claims serve to explain the principles of the technology. In the drawings:

DETAILED DESCRIPTION

Figure 1:
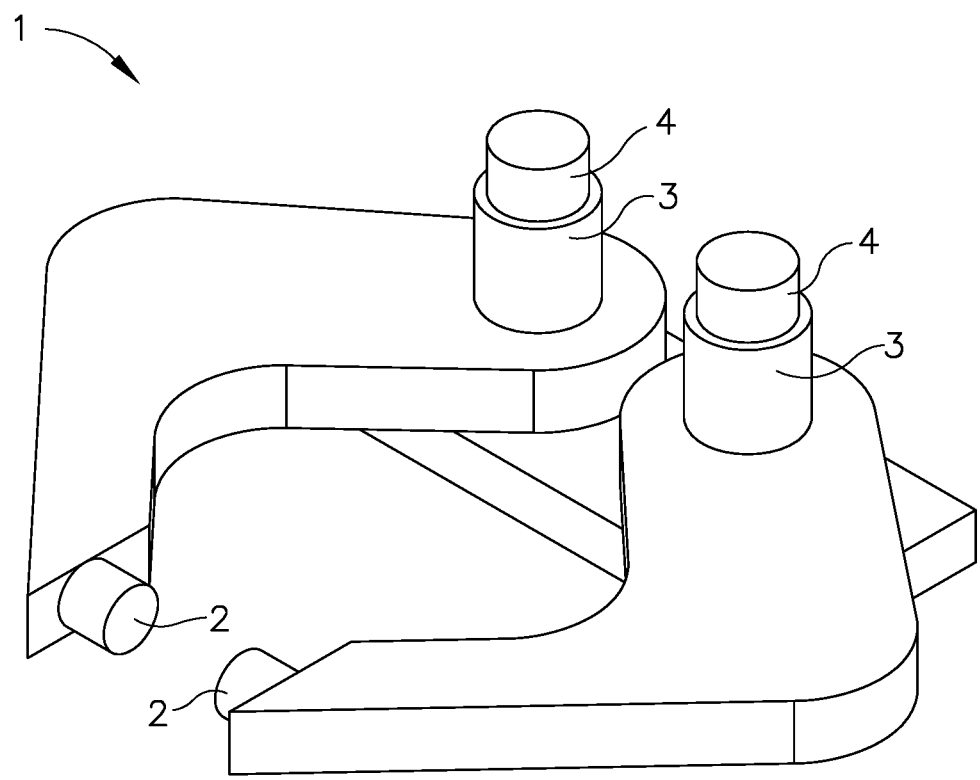
FIG. 1 is a perspective view of a gripper-style robot end effector unit, known in the prior art.
Figure 2:
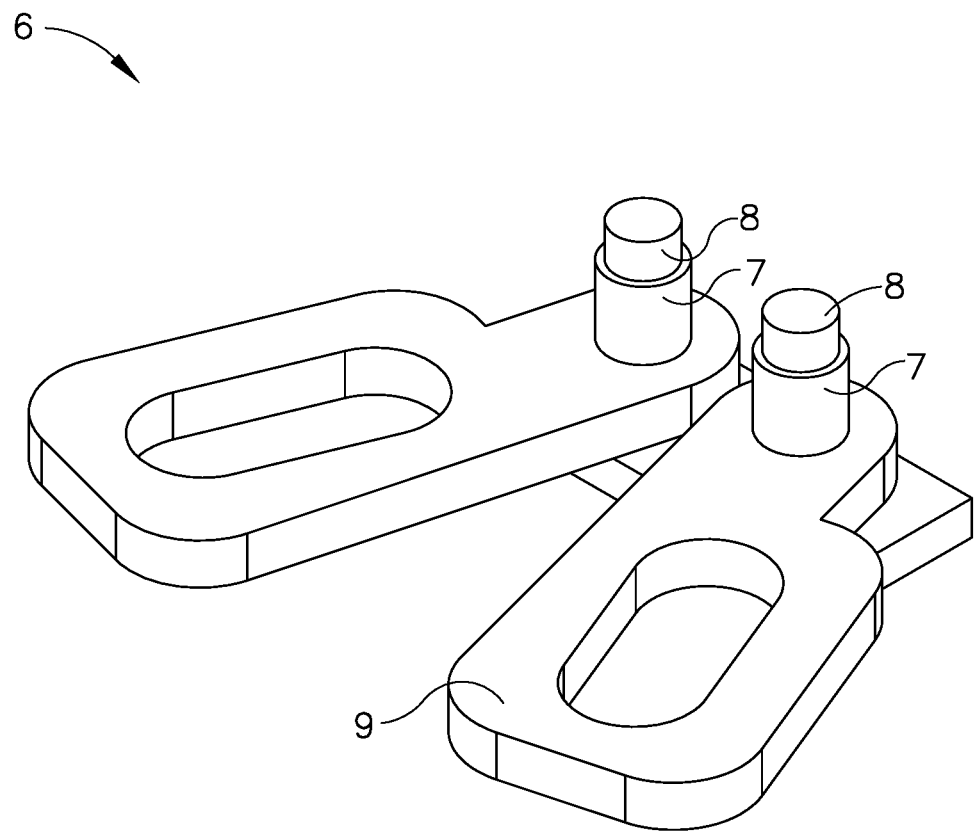
FIG. 2 is a perspective view of a robotic interface device for use in controlling the end effector unit of FIG. 1, known in the prior art.

Reference will now be made in detail to the present preferred embodiment, an example of which is illustrated in the accompanying drawings, wherein like numerals indicate the same elements throughout the views.

It is to be understood that the technology disclosed herein is not limited in its application to the details of construction and the arrangement of components set forth in the following description or illustrated in the drawings. The technology disclosed herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

The terms "first" and "second" preceding an element name, e.g., first inlet, second inlet, etc., are used for identification purposes to distinguish between similar or related elements, results or concepts, and are not intended to necessarily imply order, nor are the terms "first" and "second" intended to preclude the inclusion of additional similar or related elements, results or concepts, unless otherwise indicated.

In addition, it should be understood that embodiments disclosed herein include both hardware and electronic components or modules that, for purposes of discussion, may be illustrated and described as if the majority of the components were implemented solely in hardware.

However, one of ordinary skill in the art, and based on a reading of this detailed description, would recognize that, in at least one embodiment, the electronic based aspects of the technology disclosed herein may be implemented in software. As such, it should be noted that a plurality of hardware and software-based devices, as well as a plurality of different structural components may be utilized to implement the technology disclosed herein. Furthermore, if software is utilized, then the processing circuit that executes such software can, in some instances, be of a general purpose computer, while fulfilling all the functions that otherwise might be executed by a special purpose computer that could be designed for specifically implementing this technology.

It will be understood that the term "circuit" as used herein can represent an actual electronic circuit, such as an integrated circuit chip (or a portion thereof), or it can represent a function that is performed by a processing device, such as a microprocessor or an ASIC that includes a logic state machine or another form of processing element (including a sequential processing device). A specific type of circuit could be an analog circuit or a digital circuit of some type, although such a circuit possibly could be implemented in software by a logic state machine or a sequential processor. In other words, if a processing circuit is used to perform a desired function used in the technology disclosed herein (such as a demodulation function), then there might not be a specific "circuit" that could be called a "demodulation circuit;" however, there would be a demodulation "function" that is performed by the software. All of these possibilities are contemplated by the inventors, and are within the principles of the technology when discussing a "circuit."

First Embodiment

Figure 3:
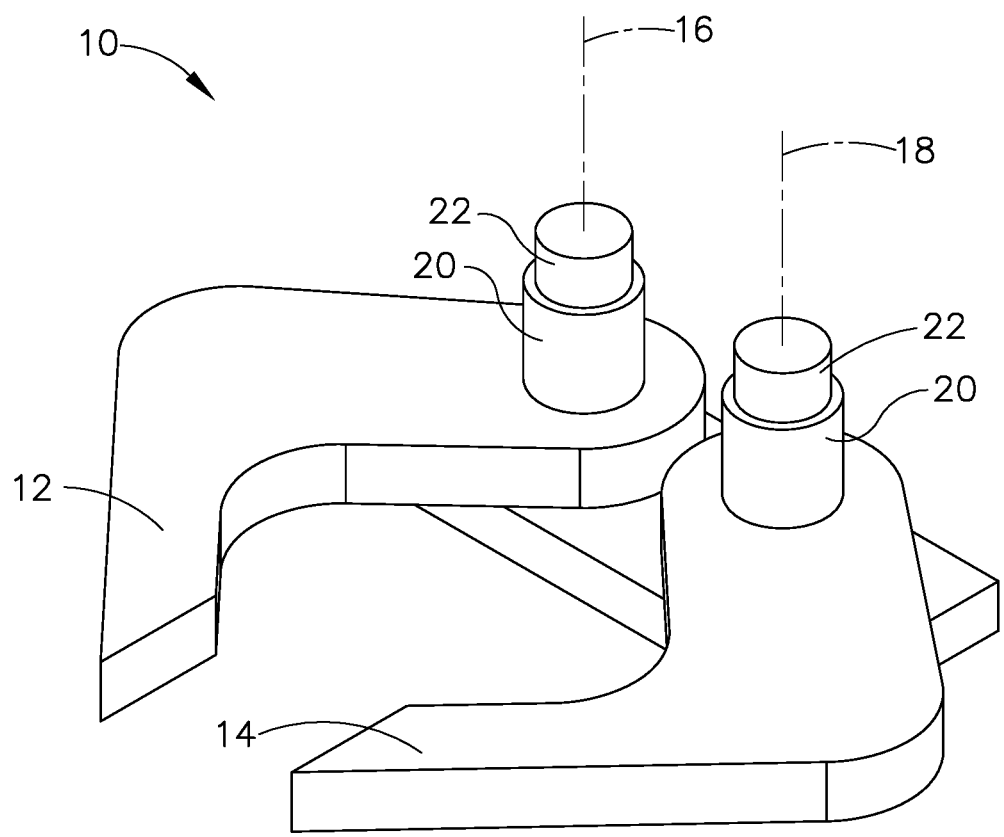
FIG. 3 is a perspective view of robotic gripper-style manipulator, as constructed according to the principles of the technology disclosed herein.
Figure 4:
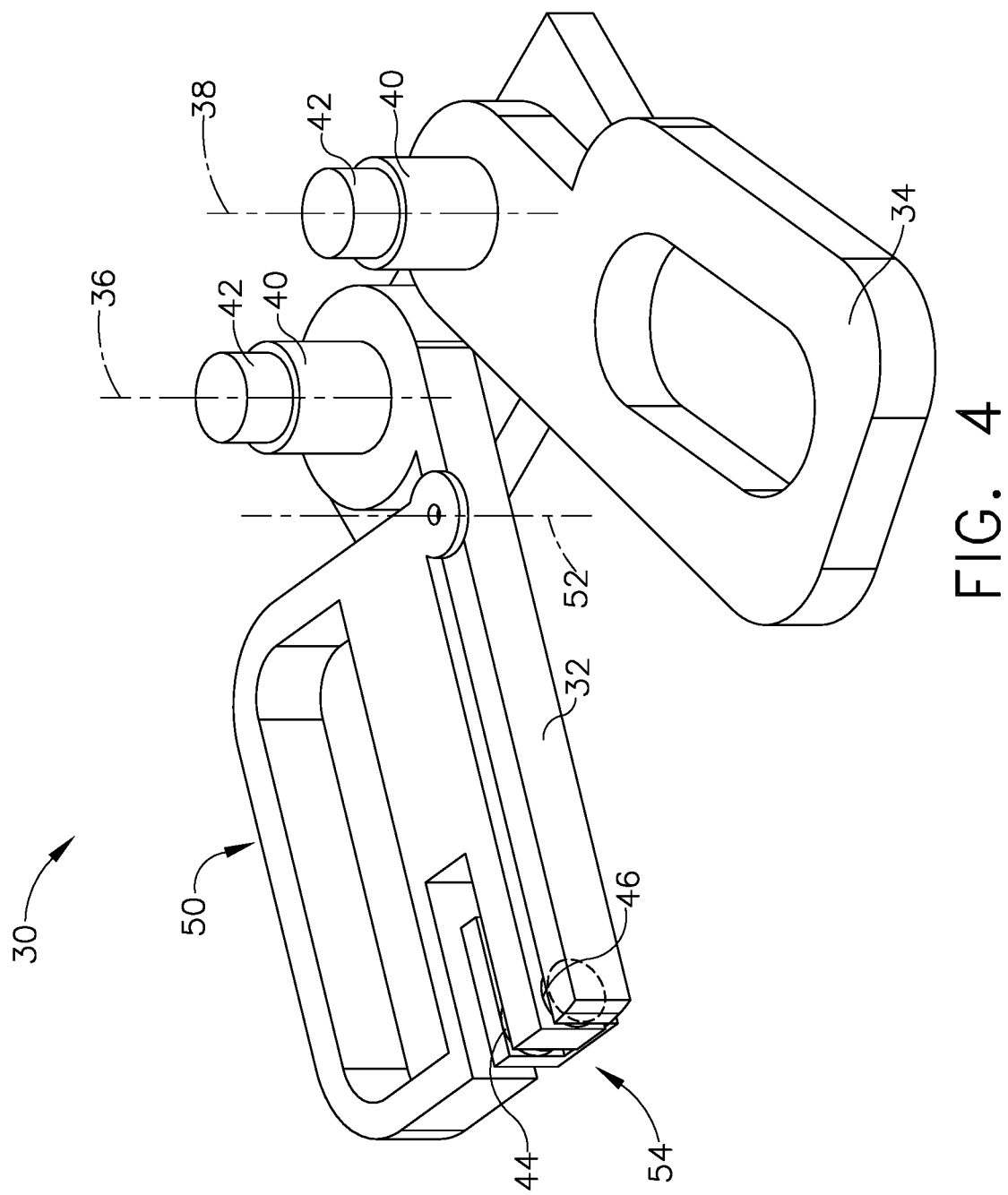
FIG. 4 is a perspective view of a robotic user input device for use in controlling the manipulator of FIG. 3, as constructed according to the principles of the technology disclosed herein.

A first embodiment is illustrated in FIGS. 3 and 4. This first embodiment includes a manipulator, generally designated by the reference numeral 10 (depicted as a gripper), an electronic controller (see FIG. 6), and an input device, generally designated by the reference numeral 30. (Note that the various "input devices" described herein are typically controlled by a human operator, or "user," and thus they are often referred to herein as a "user input device." In this description, the phrases "input device" and "user input device" have the same meaning.)

The manipulator has two gripper members 12 and 14, each attached on a rotational hinge at a pivot axis 16 and 18, respectively. Force is applied to the gripper members 12, 14 by an electric motor 20 mounted on each gripper member, in which each motor 20 incorporates a potentiometer 22 to measure angular position. Therefore, in general terms, the manipulator 10 includes two position sensors 22, two actuating motors 20, and two controlled structures 12 and 14, which make up a type of motion-controlled machine.

In this first embodiment, the input device 30 incorporates the same number of degrees of freedom as the manipulator 10. A gripper portion of the input device includes two members 32 and 34 designed for use by a human hand. The gripper members 32, 34 are rotationally hinged at two pivot axes 36 and 38, and these hinge points each have an electric motor 40 and a rotary (angular) position sensor 42 (such as a potentiometer) mounted thereto.

Figure 4A:
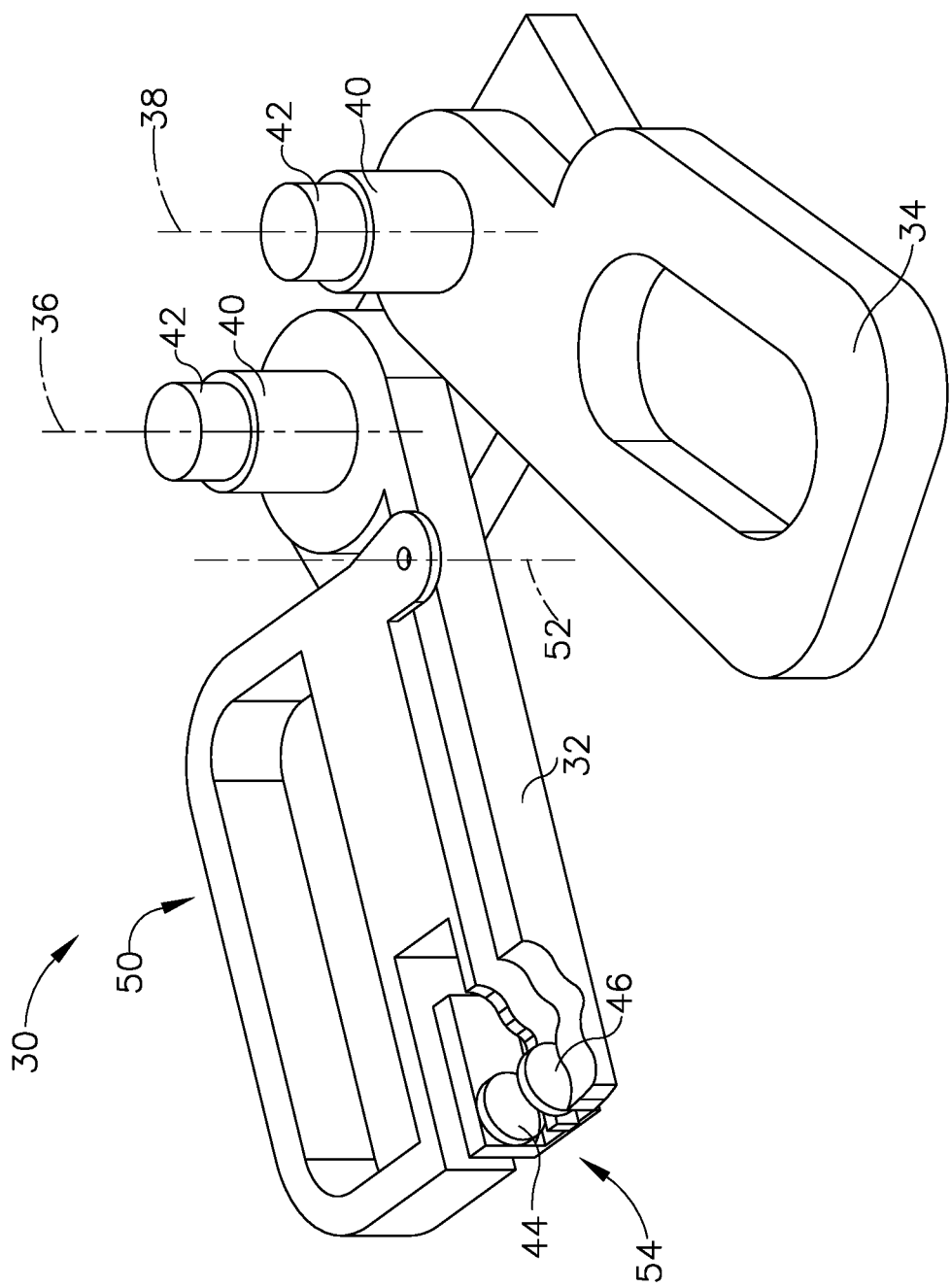
FIG. 4A is a perspective view of a robotic user input device of FIG. 4, in partial cutaway, showing the control area with force sensors.
Figure 4B:
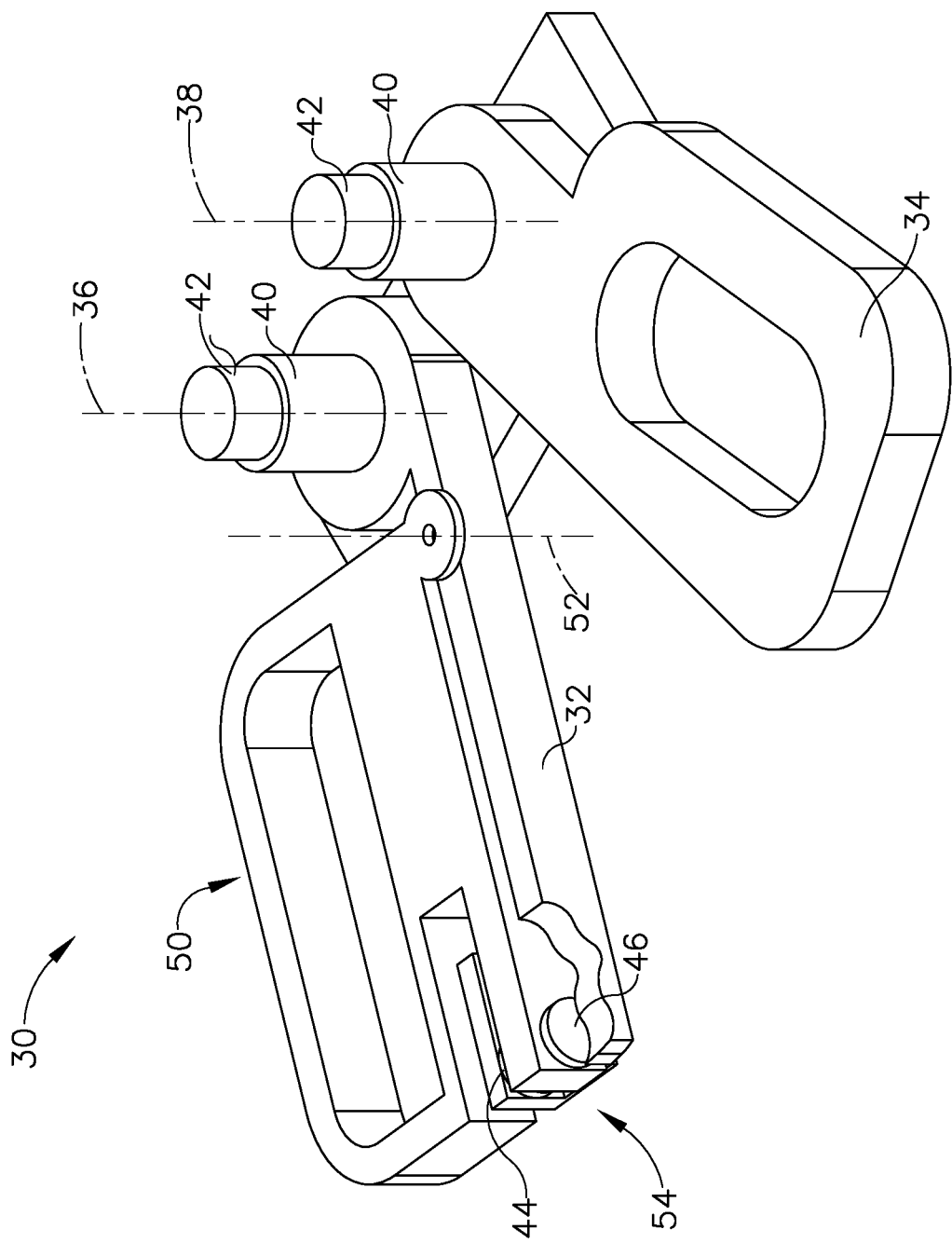
FIG. 4B is a perspective view of a robotic user input device of FIG. 4, in partial cutaway, showing the control area with force sensors.

One of the members (i.e., member 32 in this illustration) incorporates a separate pivotable member 50 that rotates on a secondary pivot axis 52 that allows a small degree of relative motion. As seen on FIGS. 4, 4A, and 4B, there is an area at 54 (a "control area") where the separate member 50 can press against a portion of the member 32; two force sensors 44 and 46 are mounted in the member 32 proximal to this control area 54. These two force sensors 44, 46 register force exerted by the separate member 50 against the member 32 (in both directions of the degree of freedom). (Note, a single force sensor could be used for a simplified design, if desired.) Therefore, in general terms, the input device 30 includes two position sensors 42, two actuating motors 40, at least one effort (or force) sensor 44 (and perhaps 46), which make up a type of motion-controlled machine. Alternatively, a more simplified version could have fewer components, such as using a single hinge, motor, and sensor, which may be used to move one or both gripper jaws.

Figure 6:
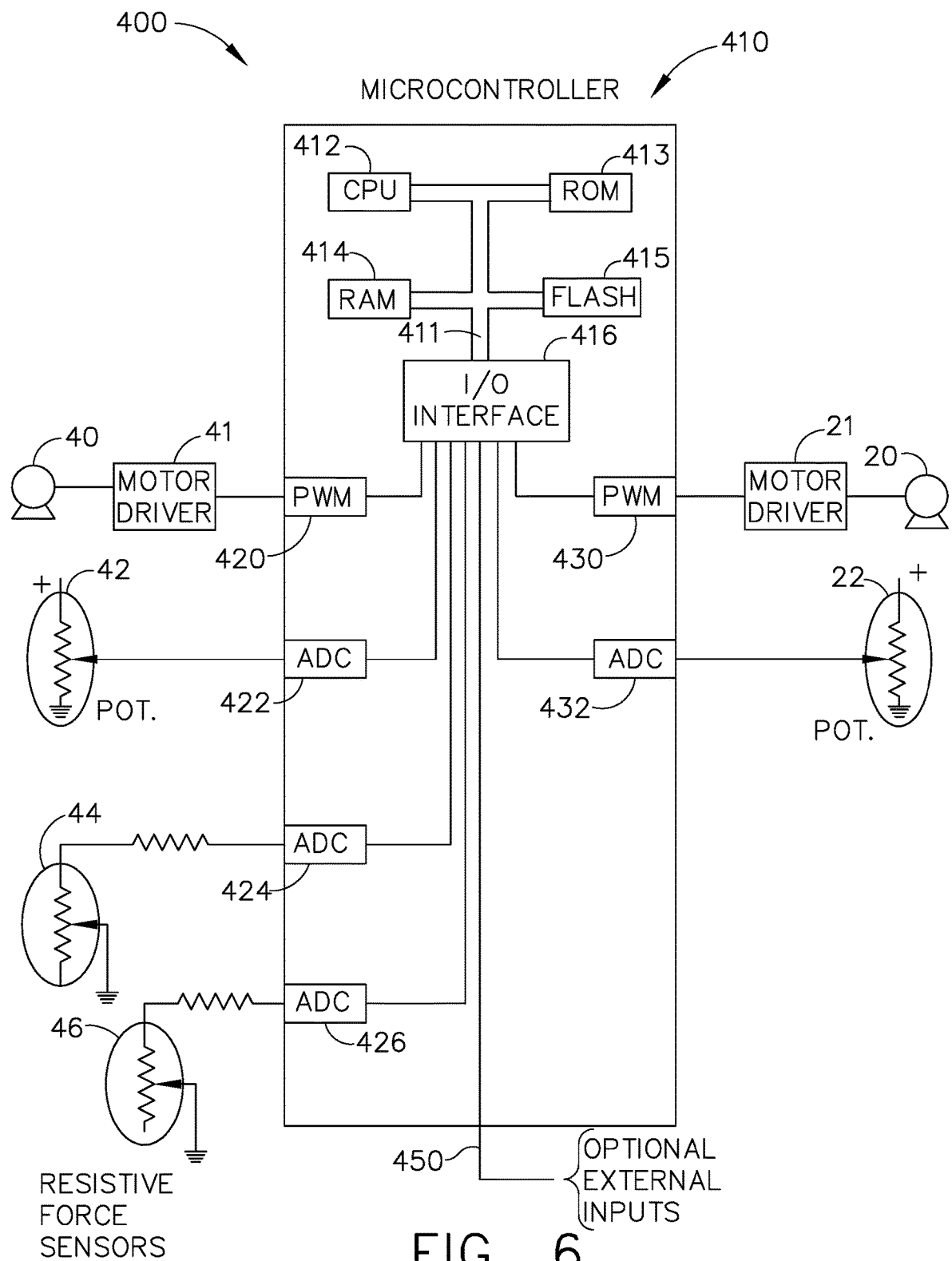
FIG. 6 is a block diagram of the major components of a system controller used to control both the manipulator of FIG. 3 and the input device of FIG. 4, as constructed according to the principles of the technology disclosed herein.

A system controller 400, discussed below in greater detail, applies a voltage to the manipulator grip motor 20 proportional to the force measured at the controller and in the direction of the engaged force sensor 44 and/or 46. The controller 400 commands the input device gripper motors 40 in the opposite direction of any measured difference between the input device gripper potentiometer(s) 42 and the manipulator potentiometer(s) 22 using, for example, a digital differential controller, and thereby achieving a sensation of touch for the operator. Note that an example implementation of the controller 400 is illustrated in FIG. 6 (and discussed below).

Figure 5:
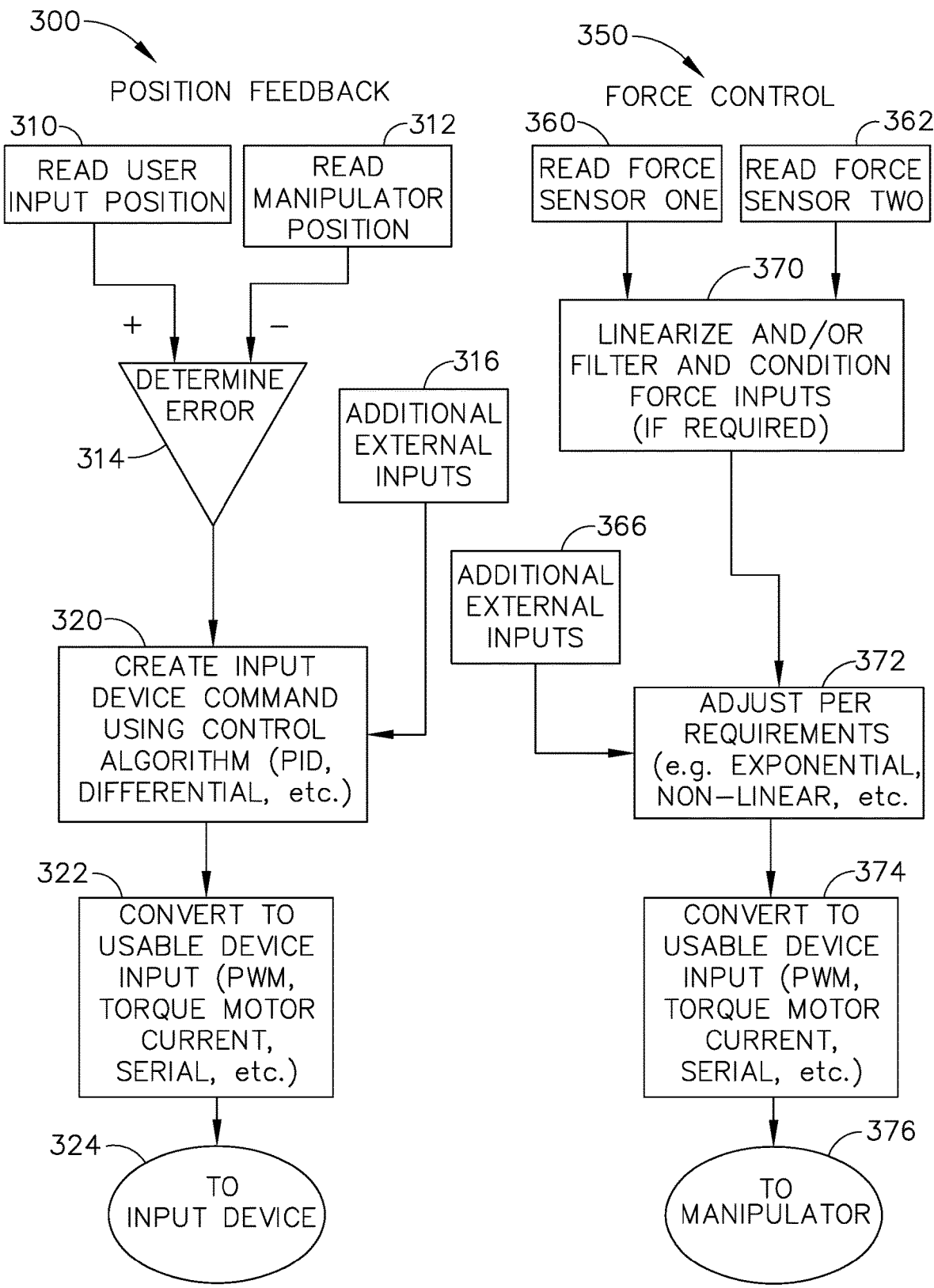
FIG. 5 is a flow chart of the steps performed by a system controller for use in controlling the manipulator of FIG. 3 on the left-hand side of the view, and for use in controlling the input device of FIG. 4 on the right-hand side of the view.

A flow chart showing some of the important functional steps used in controlling the manipulator 10 and input device 30 is provided in FIG. 5. There are two major portions of the overall control logic, a "position feedback" portion 300 and a "force controller" portion 350. (Note that the force controller 350 can also be referred to as an "effort controller," for situations where the effort sensor is a torque or pressure sensor, for example.) These two control logic schemes are designed to work concurrently.

Flow Chart of Controller Scheme:

Referring now to FIG. 5, a flow chart is provided showing some of the important steps for controlling the manipulator 10, using signals from both the input device 30 and the manipulator 10. FIG. 5 illustrates two separate flow charts: (1) a position feedback scheme for reading and controlling the input device 30, generally designated by the reference numeral 300, and (2) a force controller scheme for reading and controlling the manipulator 10, generally designated by the reference numeral 350.

For the flow chart 300, the words "Position Feedback" represent a control algorithm that commands the user input device 30 to a position (in real time), based on the current position of the manipulator 10. In the first embodiment, this means that the value of the user input device potentiometer 42 will be compared to the value of the manipulator potentiometer 22, and the error between the two are determined. The control algorithm will then create a value to command the motor 40 at the user input device in the opposite direction of the potentiometer error, until the error is resolved. The algorithm allows for external inputs to adjust the user input device command, such as by use of changes in gain based on external conditions. These external inputs may include or be based on inputs to the force control algorithm, such as force input values.

For the flow chart 350, the words "Force Control" represent a control algorithm that commands the manipulator 10, based on a determined force input (in real time) from the user input device 30. (Note that "force control" is a subset of "effort control." Any type of phenomena like torque, pressure, or radiation, for example, could be used instead of force for use with this kind of "effort" control algorithm.) This force control algorithm does not command the manipulator 10 to a specific position. After reading the force from one or more force sensors (44 and 46 in the first embodiment), the signals are conditioned and/or linearized as required by the particular implementation. The force signal is adjusted as per the requirements of the device, such as converting to an exponential relationship or a non-linear relationship. External inputs can further adjust the "main inputs" such as by increasing gains due to the external environment. This force command is then converted to usable motor driver signal format.

Referring to flow chart 300, a step 310 is performed, in which the user input device position is read from the position sensor mounted on the user input device, such as potentiometer 42 in the first embodiment. This input is used to determine position error between the manipulator and user input device to determine required position command to the user input device. At a step 312, the manipulator position is read from the position sensor mounted on the manipulator, such as potentiometer 22 in the first embodiment. This input is used to determine position error between the manipulator 10 and user input device 30 to determine required position command to the user input device 30.

The difference between the position value of the manipulator and of the user input device is calculated at a step 314. This difference is used to determine the command required to move the user input device 30 to match the position of the manipulator 10 for the purposes of achieving position feedback.

It may be required to adjust the user input device control system to adapt to external environments, including force applied to the user input device (measured at sensors 44 and 46 in first embodiment), which is not a part of the base user input device control system. These adjustments can include such things as changing control gain based on force, or movement of another degree of freedom. A step 316 in the flow chart provides such additional external inputs, if needed.

The position feedback algorithm now determines the appropriate user input device command, at a step 320. This process uses the difference between the manipulator position and the user input device position, plus (optional) additional external inputs that are provided at the step 316, and a pre-programmed control algorithm (such as PID, differential, or bang-bang) to determine the magnitude and direction of the position device command, motor 40 in the first embodiment. Creating the input device command output value does not depend on value measured at the user input device force sensor(s) (44 and 46 in the first embodiment), although the control algorithm may use force as one of the external inputs (from step 316) to make control adjustments, such as gain.

The numerical command determined in step 320 must be adjusted into something usable by the downstream electronics (e.g., PWM 420 in the first embodiment). For instance, a step 322 may develop a positive integer in which commands below a certain value command the gripper "in", and commands above a certain value command a gripper "out". Step 322 determines what command (e.g., the PWM duration in the first embodiment) must be sent to the downstream hardware to achieve the commanded position.

A step 324 outputs the command signal to the input device 30. In the first embodiment, this entails creating a PWM output 420 (see FIG. 6) that will command the user input device motor 40 in the correct direction with the correct pulse width signal value.

Referring to flow chart 350, two steps 360 and 362 are performed, in which the raw information from the one or two force sensors on the input device are read (e.g., sensors 44 and 46 in the first embodiment). Depending on the nature of the force sensor being used (e.g., resistive, piezo, Wheatstone bridge strain gauge, etc.), the nature of the force sensor output may not be linear. In the case of first embodiment, resistive force sensors would typically be used, which tend to have logarithmic response to force, and therefore, generally require conditioning in a step 370 to linearize the input signal values and also to filter out high frequency noise. Only one of the two force sensors will generally give a greater than zero force output at a time, but in the case where the mechanical design engages both force sensors at all times, the higher of the two typically must be selected and conditioned as representing the force and direction intended by the user.

As noted above, the characteristics of various available force sensors generally require conditioning. In many cases, resistive force sensors (such as those used on the example diagram of FIG. 6) are highly non-linear and often noisy signals. The step 370 processes these signals into a more usable form, through mathematical linearization and noise filtering as required.

It may be necessary to adjust the manipulator control algorithm based on the external environment, such as raising or lowering gain based on manipulator speed or the condition of another degree of freedom. A step 366 in the flow chart collects these application specific variables so that they can be appropriately accommodated, if required, in the next step 372.

A step 372 is provided to adjust the force signals as per the specific requirements of the engineering application. For example, it may be desirable to simultaneously have a high degree of dexterity at low force input levels and high output force with significant force amplification at high force input levels. Step 372 would create an exponential output in such a case. Step 372 also accommodates external inputs from step 366 and adjusts the force output signal appropriately, such as raising or lowering gain based on manipulator speed in the first embodiment, or the position of other degrees of freedom.

The numerical command value determined in 372 must be adjusted into something usable by the downstream electronics (such as PWM 430 in the first embodiment). For instance, a step 374 may develop a positive integer in which commands below a certain value command the gripper "in", and commands above a certain value command the gripper "out". Step 374 determines what command (such as PWM duration in the first embodiment) must be sent to downstream hardware to achieve the commanded position. Note that in this example of an effort (or force) controller scheme, a main purpose to be achieved is for the user's effort at the robotic input device to be essentially mirrored at the robotic manipulator.

A step 376 outputs the command signal to the manipulator 10. In the first embodiment, this entails creating a PWM output 430 (see FIG. 6) that will command the user manipulator motor 20 in the correct direction with the correct pulse width signal value.

Block Diagram of System Controller:

Referring now to FIG. 6, a block diagram showing the major electrical and electronic components is illustrated for use with the first embodiment depicted in FIGS. 3 and 4, and generally designated by the reference numeral 400. It will be understood that the design illustrated in this block diagram 400 can also be used with many other types of manipulators and user input devices with either minor design changes, or exactly as shown in FIG. 6.

In this first embodiment the control calculations, generation of control signals, and acquiring and processing of input signals is handled by a microcontroller 410. In this exemplary embodiment, the microcontroller is a self contained electronic component containing at least two pulse width modulation (PWM) timers 420 and 430, four analog-to-digital converters (ADC) 422, 432, 424, and 426, a central processing unit (CPU) 412, a memory module 413, 414, 415, a general purpose bus 411 containing associated address lines, data lines, and various I/O lines, and perhaps a general purpose input/output interface circuit 416 (GPIO). (The GPIO could be arranged as several individual I/O ports, use as USB ports, for example.)

The microcontroller CPU 412 executes preprogrammed instructions that are resident in the memory circuit 413-415, which then determine (in real time) the required control outputs to be sent to the PWM timers 420 and 430, based on analog inputs from the ADCs 422 and 432, and external inputs presented to the GPIO 416. The CPU executes the computer program, such as that described in FIG. 5.

The PWM output 420 to motor 40, in this example, is opposite and is related to the difference between ADC input 422 from potentiometer 42 and input 423 from potentiometer 22, based on a preprogrammed control algorithm (e.g., bang-bang, PID, proportional, etc.). The commanded direction for PWM output 430 is determined based on which force sensor (44 or 46) is engaged, based on the inputs to ADC 422, 424, and 426. The pulse width PWM output to motor 20 from PWM timer 430 is related (e.g., linear, exponential, logarithmic, etc.) to the magnitude of force measured on force sensor 44 or 46, as input to ADC 424 and 426. PWM outputs 420 and 430 can also be adjusted by optional user defined external input signals 450 at the GPIO 416.

ADC 422 reads input values from the user input device 30. For a single degree of freedom, these inputs comprise at least one position sensor (potentiometer 42 in this embodiment) and at least one force sensor or force sensor array (Resistive Force Sensors 44 and 46 in this embodiment). These sensors detect the user movements for input device position and user-applied force in at least one direction of the degree of freedom. (Note: both directions are used in this illustrated embodiment.)

ADC 432 reads manipulator position for one degree of freedom from a position sensor (potentiometer 22 in this illustrated embodiment). This position is used by CPU 412 to control the user input device position command.

PWM 420 sends a command signal to a motor driver circuit 41, which drives motor 40, based on an output signal from CPU 412 with the intention of relating user input device position to manipulator position. PWM 420 determines polarity and magnitude of the electrical drive signal sent by motor driver 41 to motor 40 in order to achieve the commanded position based on the difference between potentiometers 42 and 22.

PWM 430 sends a command signal to a motor driver circuit 21, which drives motor 20, based on an output signal from CPU 412 with the intention of relating (1) force applied to the motor 20 to (2) the force sensor input signal to ADC 422, from the force sensors 44 and 46. The PWM 430 output is not related to position, and it applies only the commanded force.

The memory circuit includes non-volatile memory 413 and/or 415, containing the program to be executed by the CPU, and volatile memory (RAM) 414. Typically the volatile memory will contain the various input values, as read by the ADCs (422, 424, 426, and 432), other input values via the GPIO interface 416, the output command values sent to the PWM timers (420 and 430) as calculated by the CPU, and also various intermediate variables used to condition and adjust each input and output, as needed for a proper software design for implementing the position feedback force control algorithms for the technology disclosed herein.

The I/O interface circuit (GPIO) 416 handles various timers, digital inputs, serial inputs, analog inputs, and any other input required by the user. These inputs can be used by CPU 412 to adjust input and output commands in user-specified ways, such as changing gains based on external conditions.

The resistive force sensors 44 and 46 measure user-applied input force in one direction each of the user input device degree of freedom. For example, if the user input device 30 is a gripper, one force sensor would measure user input gripper opening force and one force sensor would measure gripper closing force. In general, only one force sensor will be engaged at one time, although an alternative mechanical gripper design may exist in which both force sensors are engaged at all times and direction is determined by the higher of the two force values read.

On FIG. 6, the signals from force sensors 44 and 46 are directed to ADCs 424 and 426. It should be noted that the analog-to-digital converters on FIG. 6 could be multiplexed, such that there are multiple analog signal lines in parallel, each carrying a different analog signal, which are sampled by a multiplexer, and then directed to a single ADC, as is known in the art. Each analog input signal could be sampled in an order as determined by the CPU-based computer program, so that a critical signal could be sampled more often than other, lesser-critical signals, if desired.

The potentiometer ("pot") 42 reads the position of the user input device 30, while potentiometer 22 reads the position of the manipulator 10. Both of these sensors (pots) are used solely for control of the user input device position. The CPU reads each position from AD 422 and 432 and creates an output command to PWM 420, based on the potentiometer input signal values.

The motor 40 is attached to the user input device 30 and moves a single degree of freedom, based on signals from PWM 420 using commands from CPU 412. The purpose of motor 40 is to ensure that the user input device position is related to the manipulator position based on preprogrammed algorithms. For example, if the user input device 30 and the manipulator 10 are similar in construction and it is desired to match the position of each, the CPU 412 may command PWM 420 to move motor 40 until potentiometers 42 and 22 read the same value. Note that the construction of input device 30 and manipulator 10 are not always similar, so the more general case would be that motor 40 is commanded to move potentiometer 42 until potentiometer 42 reads a desired value, based on the current value of potentiometer 22. In cases where the design of the gripper and manipulator are dissimilar, it may be desirable to relate the position of the user input device 30 and the manipulator 10 in some other way (e.g., using an exponential, logarithmic, or non-linear function).

The motor 20 is attached to the manipulator degree of freedom and is intended to apply a force to the manipulator 10 in a magnitude and direction, as commanded by the CPU 412, and related to force sensor 44 and 46 input values detected through ADCs 424 and 426. The command to motor 20 is not related to position, but solely related to force input, and is intended to apply force to the manipulator 10.

Motor driver circuits 41 and 21 convert the PWM magnitude and direction commands into an amplified pulse width modulated signals with controlled polarity to the motors 40 and 20, respectively, by use of an H-Bridge. As such, the motor driver output voltages controlled by PWM 420 and 430 are provided by the motor driver circuits 41 and 21, respectively, through the use of transistors in an H-bridge configuration or in a self-contained H-bridge integrated circuit. The motor driver output signals will exhibit a series of high current pulses to provide the motors with an appropriate "effective" operating voltage. Unless the duty cycle of the pulses is at 100%, this effective operating voltage will be somewhat less than the available maximum motor driver voltage, and the output voltage duty cycles instantaneously change as needed, all as determined by the CPU 412. The polarity of the H-bridge output pulse signals are also determined by the CPU 412.

Second Embodiment

Figure 7:
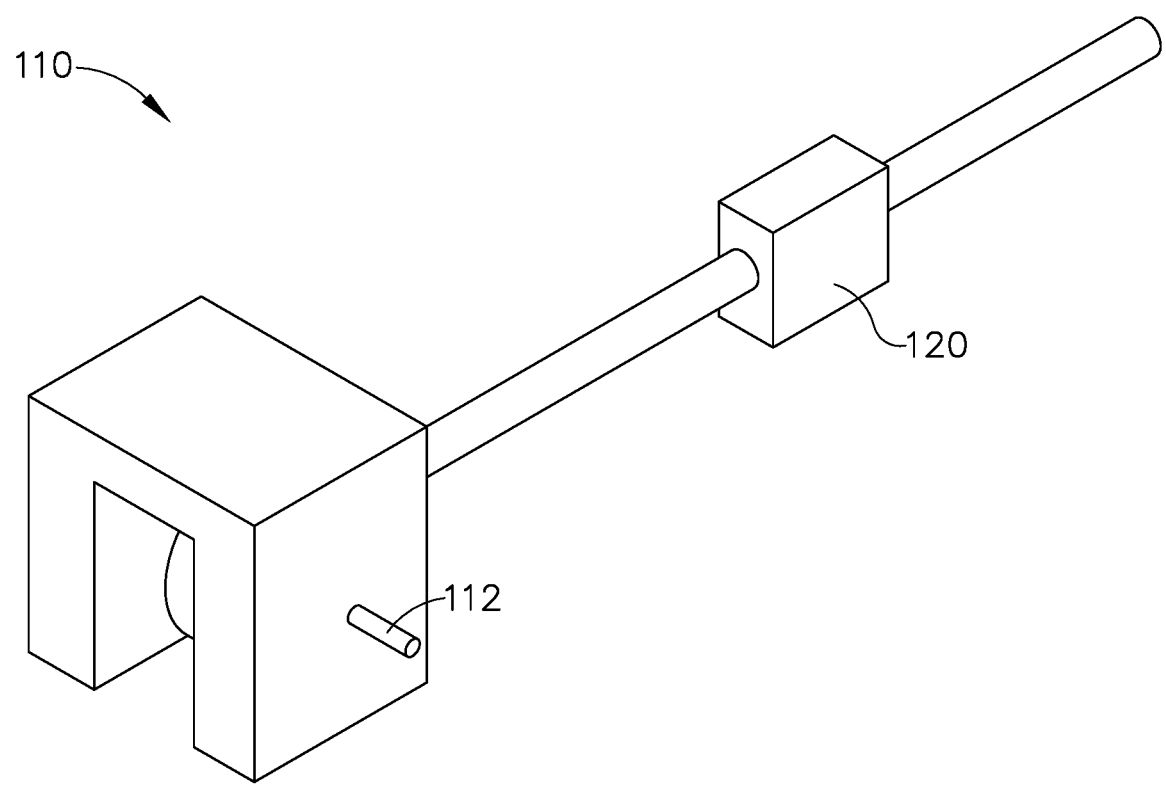
FIG. 7 is a perspective view of a robotic manipulator in the form of a hydraulic cylinder, for use with a controller such as that of FIG. 6, as constructed according to the principles of the technology disclosed herein.
Figure 8:
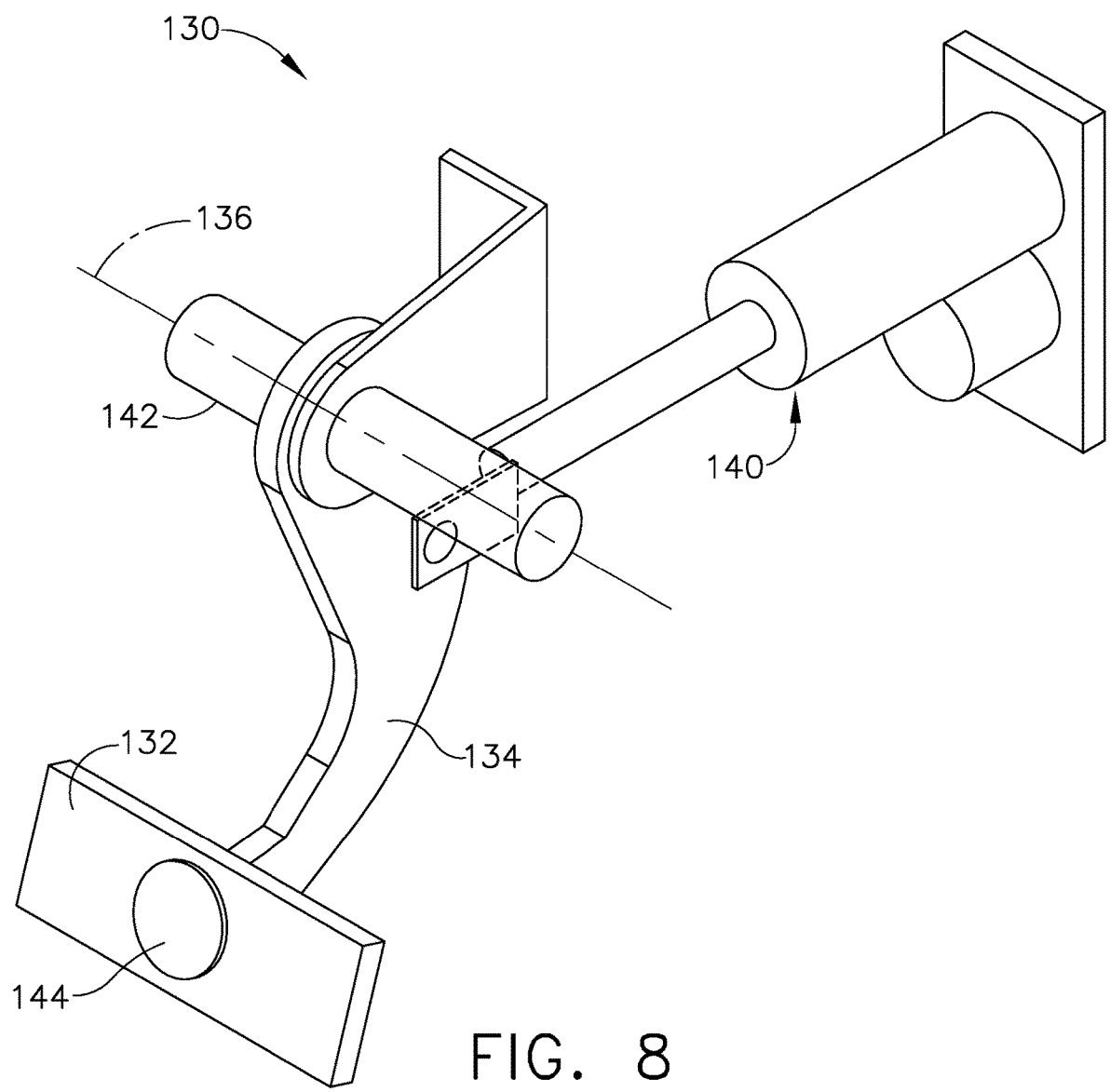
FIG. 8 is a perspective view of a robotic input device in the form of a brake pedal, for use with a controller such as that of FIG. 6 and for controlling the manipulator of FIG. 7, as constructed according to the principles of the technology disclosed herein.

A second embodiment is illustrated in FIGS. 7 and 8. This second embodiment includes a manipulator, generally designated by the reference numeral 110 (depicted as a hydraulic brake cylinder for actuating a brake caliper), an electronic controller (see FIG. 6), and an input device, generally designated by the reference numeral 130 (depicted as a brake pedal).

Referring now to FIG. 7, the manipulator 110 comprises a hydraulic cylinder, similar to a brake caliper. The hydraulic pressure of the cylinder's piston is controlled by a valve 120, and the cylinder's position is measured by a linear potentiometer 122. Referring now to FIG. 8, the input device 130 includes a pedal subassembly 130, which comprises a pedal, having a foot pad 132 that is attached to a lever or similar rotatable member 134, which is further attached to a hinge so that the lever/pedal arrangement rotates about the hinge, having a pivot axis 136.

A force sensor 144 (i.e., the "effort sensor" in this exemplary embodiment) is installed on the pedal foot pad 132 and senses the force applied by the operator's foot. (The pedal is the "control area" in this example.) The pedal position is detected by a rotary position sensor 142, such as a potentiometer. The pedal position is controlled by an electrically-controlled linear actuator 140. The system controller reads the position sensors of the pedal and hydraulic cylinder (i.e., sensors 142 and 122, respectively), as well as the force sensed by the input device force sensor 144. The controller logic (see FIG. 5 for an example) sends a position command to the hydraulic valve 120 that is related (e.g., proportional) to the force measured at the pedal (using sensor 144), thus creating a force at the hydraulic cylinder related to the force sensed at the pedal. The position of the hydraulic cylinder is measured by the position sensor 112, and that information is appropriately adjusted (perhaps magnified) to determine the desired input device position. Please see the next paragraph for a more detailed discussion.

It should be noted that the controller logic may be programmed to provide a linear, a non-linear, an exponential, or virtually any other relationship between the force sensor and the valve position, either using one or more mathematic functions or perhaps using one or more look-up tables stored in memory. In this example of the second embodiment, the controller 400 commands the pedal 130 in a direction opposite the difference (in desired vs. measured position) between the piston and the pedal, using a PID (proportional-integral-differential) controller. For example, the rotational position of the pedal is mapped to the translational position of the hydraulic cylinder in any "proportional" way, such as linear or exponential. The overall system thus achieves a sensation of touch to the operator of the brake pedal subassembly 130.

Third Embodiment

Figure 9:
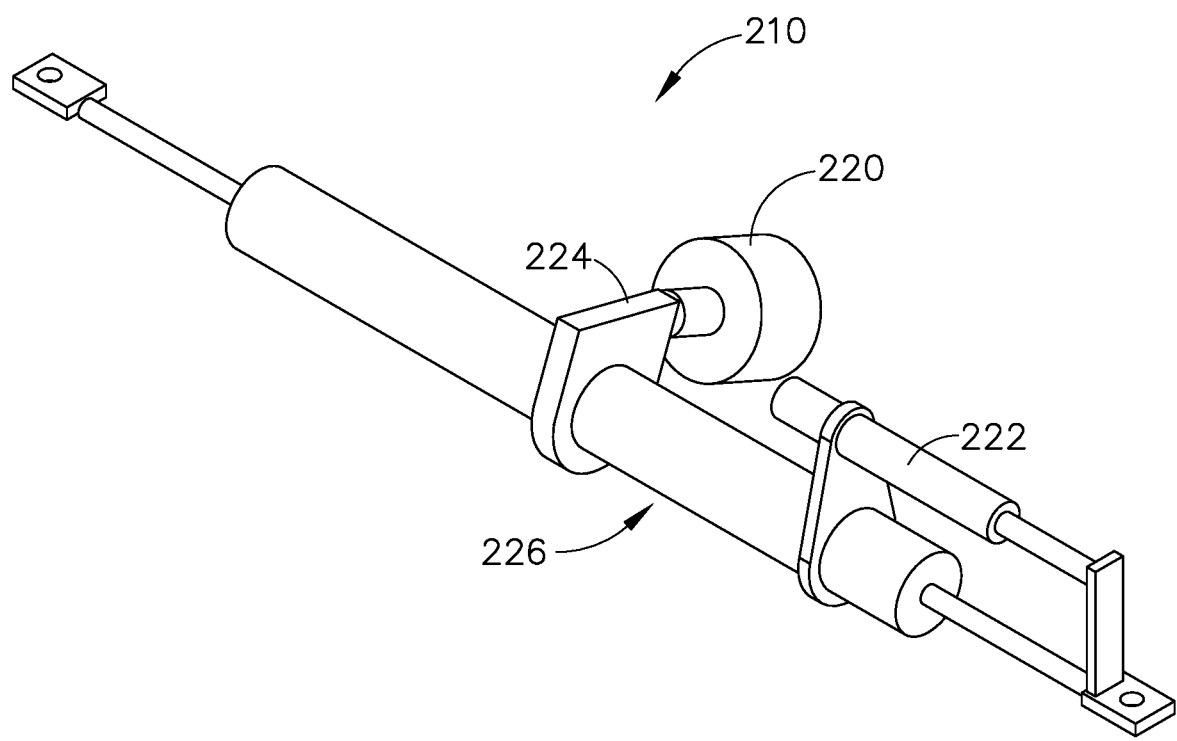
FIG. 9 is a perspective view of a robotic manipulator in the form of a rack and pinion steering system, for use with a controller such as that of FIG. 6, as constructed according to the principles of the technology disclosed herein.
Figure 10:
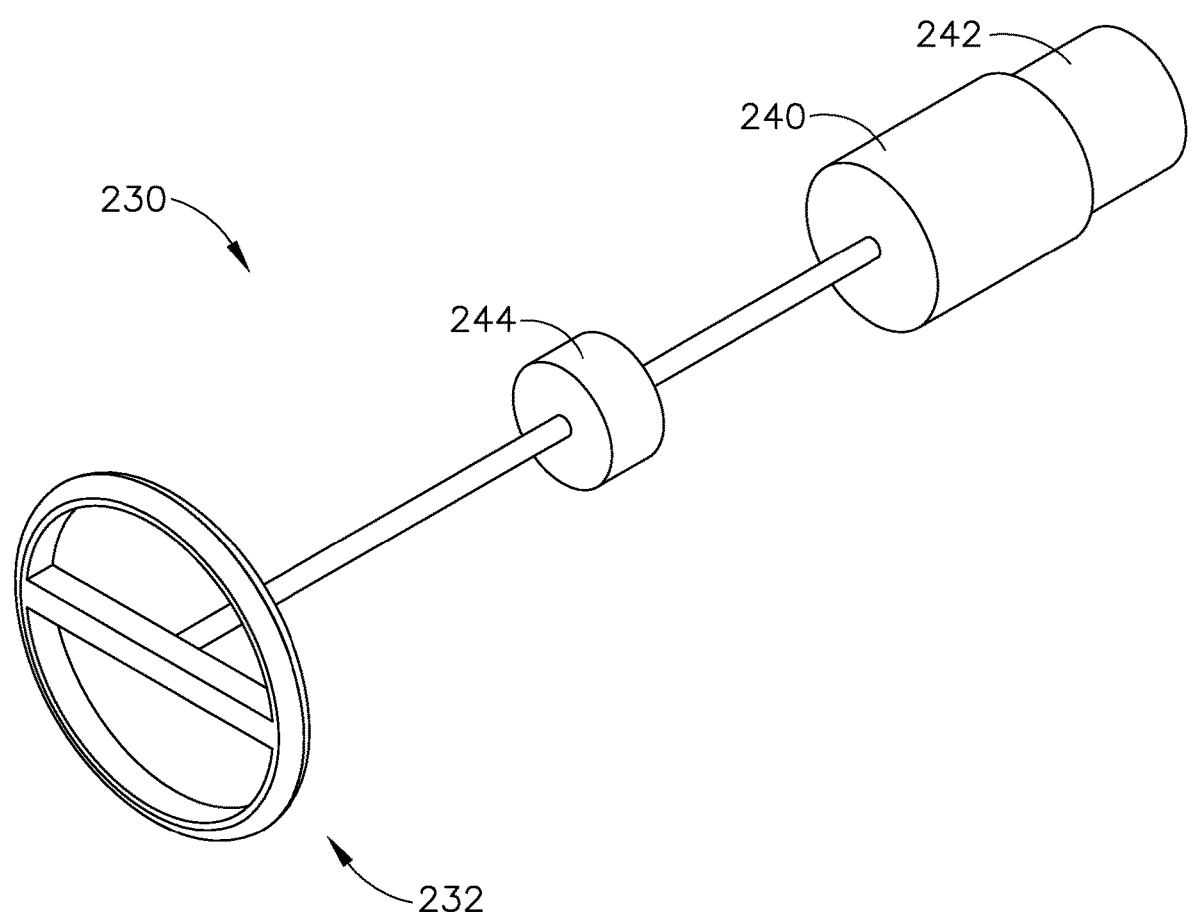
FIG. 10 is a perspective view of a robotic input device in the form of a steering wheel, for use with a controller such as that of FIG. 6 and for controlling the manipulator of FIG. 9, as constructed according to the principles of the technology disclosed herein.

A third embodiment is illustrated in FIGS. 9 and 10. This third embodiment includes a manipulator, generally designated by the reference numeral 210 (depicted as a rack and pinion steering subassembly), an electronic controller (see FIG. 6), and an input device, generally designated by the reference numeral 230 (depicted as a steering wheel subassembly).

Referring now to FIG. 9, the manipulator 210 comprises a motor 220 mounted on a pinion 224, and a capacitive linear position sensor 222 mounted on a rack 226. The actual "steering position" of the rack and pinion subassembly is controlled by the motor 220, and the steering instantaneous position is measured by the linear position sensor 222.

Referring now to FIG. 10, the input device 230 includes a steering wheel 232 attached to a motor 240 that incorporates a rotary encoder 242. (The steering wheel is the "control point" in this exemplary embodiment.) The motor shaft interfaces with the steering wheel through a rotary torque sensor 244 (which is the "effort sensor" in this embodiment). Using control logic, such as described in FIG. 5, the system controller 400 converts wheel torque (measured by sensor 244) to voltage, which is transmitted to the pinion motor 220, which can be adjusted for other user-defined inputs, such as vehicle speed. Rack position and wheel position are measured (by sensors 222 and 242, respectively) and the controller 400 directs the steering wheel 232 in a direction opposite the measured position difference, using a bang-bang controller, for example. In this way a sensation of feel is achieved.

It will be understood that the automotive embodiments of FIGS. 7-10 could have great usefulness with the new technology automatically-driven cars and trucks that are to ultimately work as driverless vehicles. Such driverless vehicles will require maintenance, and when being serviced, it will likely be necessary to have a manual control mode available for moving such vehicles around the service area. Such vehicles could have a full-sized steering wheel and brake pedal system, but that full-sized system would either have to be a completely separate manually-operated system, perhaps completely mechanical/hydraulic, or would need to be somehow integrated into the automatic "input device-manipulator" control system. More likely, such vehicles will ultimately be supplied with a smaller-scale manual control system, and that system could use the "input device-manipulator" control system of the technology disclosed herein. Such a smaller-scale manual control system could be packaged in a fold-out stowage area, for example, and could be opened and moved into position for actual use, only as needed.

Fourth Embodiment

Figure 11:
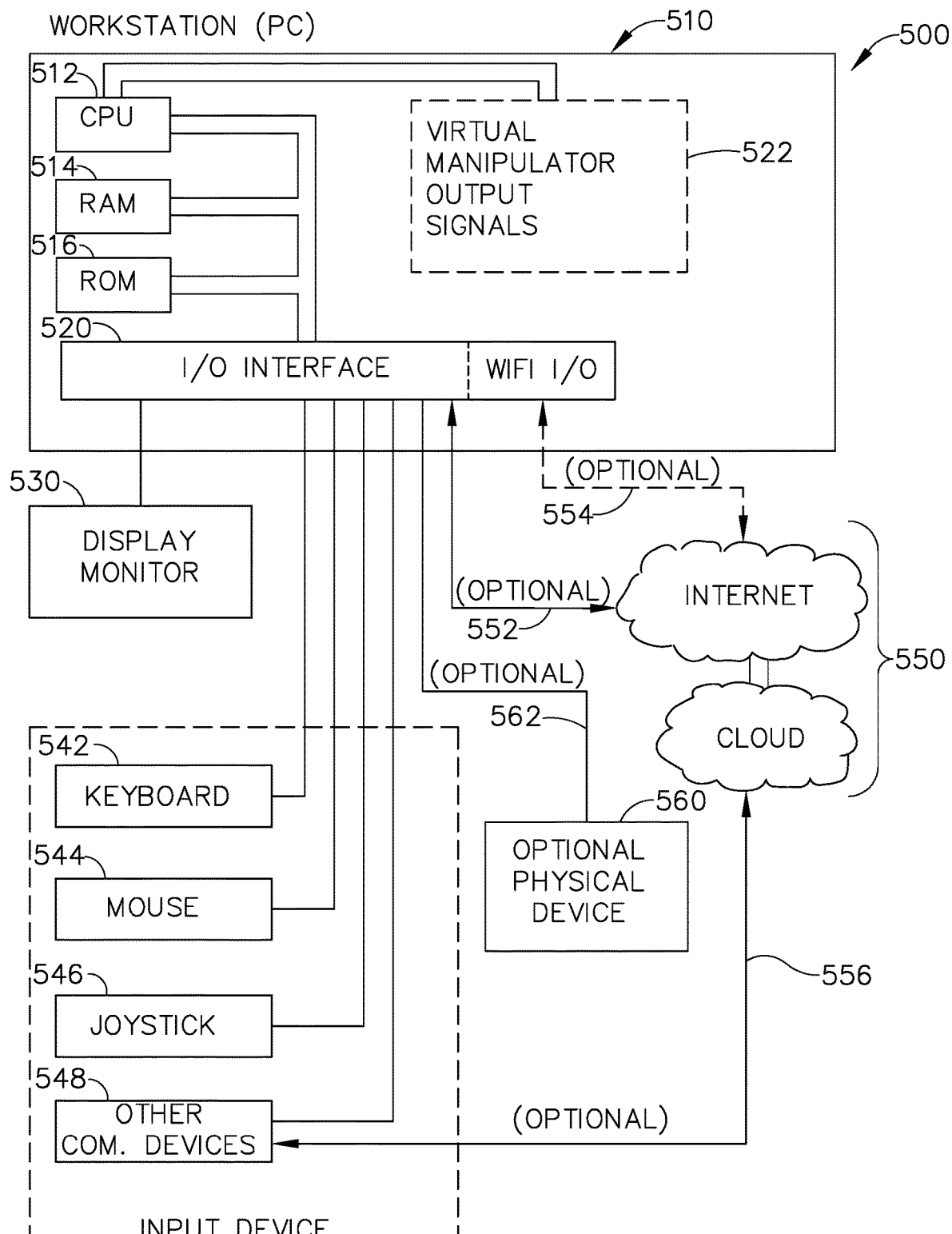
FIG. 11 is a block diagram of the major components of a system controller used to control a robotic virtual manipulator, as constructed according to the principles of the technology disclosed herein.

A fourth embodiment is illustrated in FIG. 11, in block diagram form. This fourth embodiment, from a control system standpoint, is identical to any of the embodiments 1 through 3, except that the manipulator is virtual, rather than physical. The manipulator force characteristics (such as motor behavior, hydraulic behavior, or otherwise) are programmed into a virtual environment that reacts to input signals from the system controller. Position of the virtual manipulator is transmitted to the controller, and depicted to the user on a display. The input device position is controlled in exactly the same way as for real manipulators.

FIG. 11 illustrates a block diagram of a typical computerized system to implement the virtual manipulator of the technology disclosed herein, generally designated by the reference numeral 500. A user could operate a workstation or personal computer (a "PC"), generally designated by the reference numeral 510 on FIG. 11. Within the personal computer 510 would typically be a microprocessor or "CPU" 512, Random Access Memory (RAM) 514, Read Only Memory (ROM) 516, and an input/output (I/O) interface circuit 520. The I/O interface 520 could contain both hard-wired and wireless inputs and outputs, as needed; the wireless types of inputs and outputs could use WiFi communications signals, if desired.

The workstation system 500 would typically also include a display monitor 530, a keyboard 542 and/or a mouse 544 and/or a control joystick 546, and perhaps other communications devices at 548. These peripheral devices 530, 542, 544, 546 are to be collectively used to comprise a virtual "input device," generally designated by the reference numeral 540.

The manipulator is virtual, as described above. The control software would be an application program (i.e., executable software) that receives the input signals from the "input device" 540, then performs the calculations that virtually control a manipulator's movements, and then creates virtual manipulator output signals using a routine 522 that also controls what is to be displayed to the user on the display monitor 530.

If desired, certain optional equipment could be added to the "base" system described above for the workstation system 500. For example, certain inputs and outputs could be communicated to and from the Internet (at 550) so that the virtual system could be displayed to remote users, and certain variables could be stored in the cloud for later use, or for storing the results of the virtual simulation being run in real time. The PC 510 could use hard-wired signals at 552 for this task, or wireless signals at 554; moreover the input device could directly send or receive signals from the Internet or cloud at 556.

Finally, an optional physical device 560 could also communicate signals to and from the workstation PC 510, using a pathway 562, which could be wired or wireless. Such a physical device could be a small-scale physical replica of the virtual manipulator, for example.

Fifth Embodiment

Figure 12:
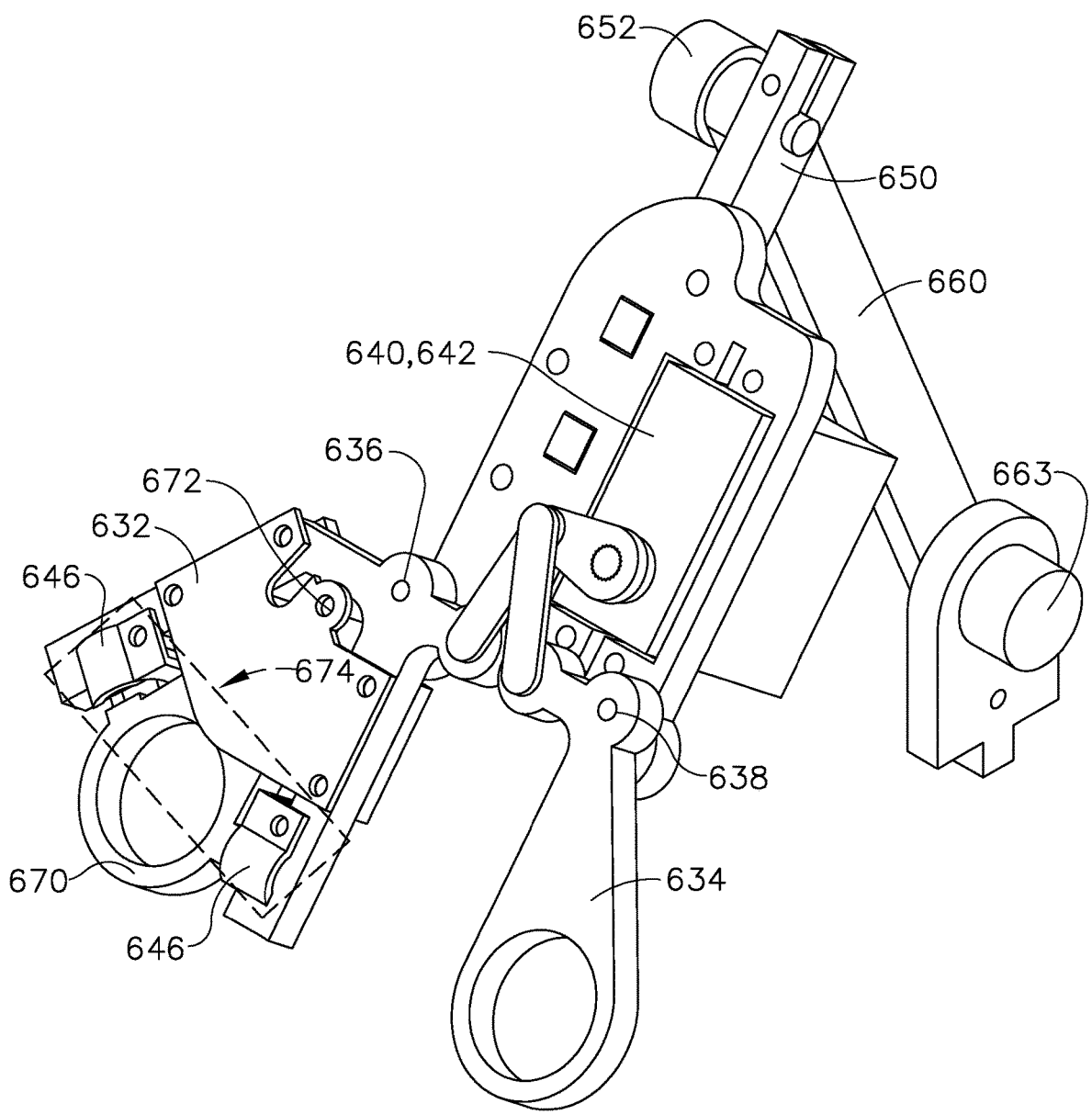
FIG. 12 is a perspective view of a robotic input device for use in controlling the manipulator of FIG. 13, having additional arm-like members, as constructed according to the principles of the technology disclosed herein.
Figure 13:
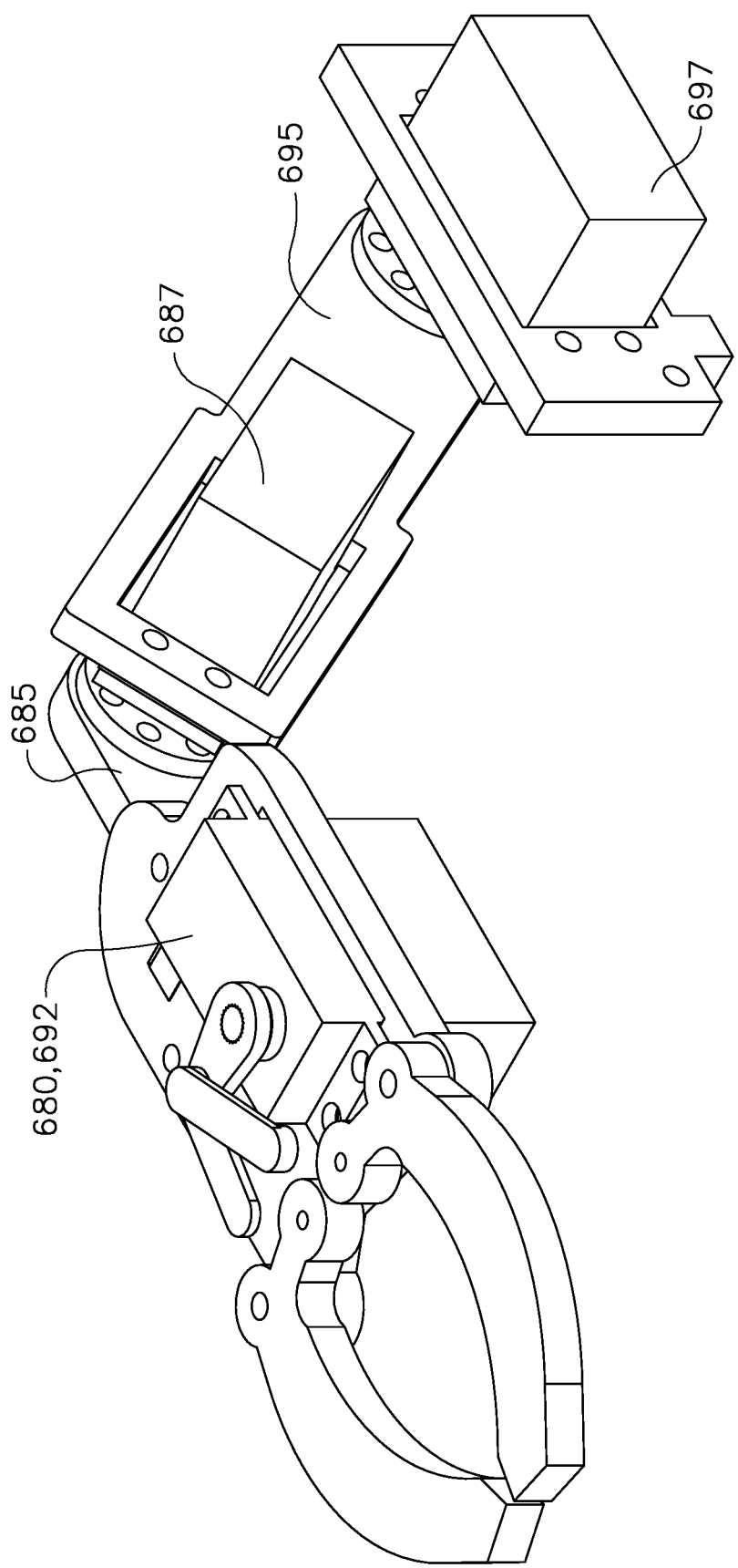
FIG. 13 is a perspective view of robotic gripper-style manipulator, having additional arm-like members, as constructed according to the principles of the technology disclosed herein.

Referring now to FIGS. 12 and 13, in yet another alternative (fifth) embodiment, feedback force control having multiple degrees of freedom is combined with traditional open loop position control, to add capability while minimizing complexity. In FIGS. 12 and 13, a robot arm is provided such that the operator can position the gripper in space, using open loop position control, while at the same time the gripper controller utilizes position feedback force control.

In FIG. 12 an input device 630 is provided that incorporates the same number of degrees of freedom as a corresponding manipulator 610. A gripper portion of the input device includes two members 632 and 634 designed for use by a human hand. The gripper members 632 and 634 are rotationally hinged at two pivot axes 636 and 638, and these hinge points are each joined to an electric motor 640 and a rotary (angular) position sensor 642 (such as a potentiometer) mounted thereto.

Additional arm-like members 650 and 660 incorporate position sensors 652 and 663 (such as a potentiometer at each location). The members 650 and 660 allow the operator to position the robot gripper in space using minimally complex open loop position control, while still maintaining the benefits of position feedback force control at the gripper itself.

At least one of the members (i.e., member 632 in this illustration) incorporates a separate pivotable member 670 that rotates on a secondary pivot axis 672 that allows a small degree of relative motion. There is an area at 674 (a "control area") where the separate member 650 can press against a portion of the member 632; two force sensors 644 and 646 are mounted in the member 632 proximal to this control area 674. These two force sensors 644, 646 register force exerted by the separate member 670 against the member 632 (in both directions of the degree of freedom). (Note, a single force sensor could be used for a simplified design, if desired.)

Therefore, in general terms, the input device 630 includes at least one position sensor 642, at least one actuating motor 640, at least one effort (or force) sensor 644 (and perhaps a second effort sensor 646), which make up a type of motion-controlled machine. Alternatively, a more simplified version could have fewer components, such as using a single hinge, motor, position sensor, and effort sensor, which may be used to move one or both gripper jaws.

In FIG. 13, a manipulator 610 is provided having robotic arm-type members 685 and 695 that rotate about a hinge at 682, having a pivot axis. The manipulator 610 also includes two position controllers 687 and 697.

A system controller (such as the controller 400, described above) applies a voltage to a manipulator grip motor 680 that is proportional to the force measured at the controller and in the direction of the engaged force sensor(s) 644 and/or 646. The system controller commands the input device 630 gripper motors 680 in the opposite direction of any measured difference between the input device gripper potentiometer(s) 692, and the manipulator potentiometer(s) 642 using, for example, a digital differential controller, and thereby achieving a sensation of touch for the operator.

The additional members 685 and 695 are controlled by position controllers 687 and 697, such that the members 685 and 695 move to the positions commanded by position sensors 652 and 663. Members 685 and 695 are utilized by the user to position the gripper using traditional open loop position control to minimize complexity, while the benefits of position feedback force control are maintained in the gripper itself. Through this arrangement the fifth embodiment is able to achieve a sensation of force to the operator at the input device and gripper (or any other or additional type of joint) effort control at the robot without the additional complexity of position feedback force control at every joint, thus providing feedback in areas where it is deemed required.

In conclusion, the overall system includes: (1) a robotic manipulator having at least one degree of freedom of translational or rotational motion, a device for applying a physical effort (e.g., force or torque) around or along the degree of freedom (at a "control point" or "control area"), and a rotational or linear position sensor; (2) a robotic input device having the same number of degrees of freedom as the manipulator, with a mechanism to control the position of each degree of freedom, at least one effort sensor (e.g., force or torque) for at least one degree of freedom, and a position sensor on each degree of freedom; and (3) a controller that reads the position sensors of each degree of freedom of the manipulator and input device and commands the input device to the position indicated by the manipulator in a position feedback arrangement.

It will be understood that, as used hereinabove, the term "force sensor" can refer to any type of effort detecting device, including force, torque, or pressure sensing devices, depending on the exact mechanical configuration of the manipulator and of the input device. An example force sensor is a strain gauge, for measuring large physical forces that are applied very stiff structures, such as metal. Pressure sensors could perhaps be substituted for force sensors in certain applications, such as measuring the physical exertion being applied to a foot pedal, for example, or for measuring a fluid's exertion on a surface.

It will be understood that the term "position sensor" can refer to any type of linear or rotational sensing devices, again depending on the exact mechanical configuration of the manipulator and of the input device. The inventor contemplates that most any linear motion can be readily converted to a rotary motion, and thus a rotational (angular) sensor could be used to detect a motion that begins as a linear movement; and vice versa.

It will be understood that the terms "motor", "actuator", "linear actuator", "rotary actuator", and the like all refer to devices that can be used to apply a force, torque, or pressure to a mechanical member, and as such, there are often multiple ways of achieving a "back force" or a "back pressure" to work in a specific type of manipulator, or in a specific type of input device, for use in the technology disclosed herein.

It will be understood that the logical operations described in relation to the flow charts of FIG. 5 can be implemented using sequential logic (such as by using microprocessor technology), or using a logic state machine, or perhaps by discrete logic; it even could be implemented using parallel processors. One preferred embodiment may use a microprocessor or microcontroller (e.g., microcontroller 410) to execute software instructions that are stored in memory cells within an ASIC. In fact, the entire microcontroller 410, for that matter), along with RAM and executable ROM, may be contained within a single ASIC, in one mode of the technology disclosed herein. Of course, other types of circuitry could be used to implement these logical operations depicted in the drawings without departing from the principles of the technology disclosed herein. In any event, some type of processing circuit will be provided, whether it is based on a microprocessor, a logic state machine, by using discrete logic elements to accomplish these tasks, or perhaps by a type of computation device not yet invented; moreover, some type of memory circuit will be provided, whether it is based on typical RAM chips, EEROM chips (including Flash memory), by using discrete logic elements to store data and other operating information (such as the environmental conditions data stored, for example, in memory circuit 414), or perhaps by a type of memory device not yet invented.

As used herein, the term "proximal" can have a meaning of closely positioning one physical object with a second physical object, such that the two objects are perhaps adjacent to one another, although it is not necessarily required that there be no third object positioned therebetween. In the technology disclosed herein, there may be instances in which a "male locating structure" is to be positioned "proximal" to a "female locating structure." In general, this could mean that the two male and female structures are to be physically abutting one another, or this could mean that they are "mated" to one another by way of a particular size and shape that essentially keeps one structure oriented in a predetermined direction and at an X-Y (e.g., horizontal and vertical) position with respect to one another, regardless as to whether the two male and female structures actually touch one another along a continuous surface. Or, two structures of any size and shape (whether male, female, or otherwise in shape) may be located somewhat near one another, regardless if they physically abut one another or not; such a relationship could still be termed "proximal." Or, two or more possible locations for a particular point can be specified in relation to a precise attribute of a physical object, such as being "near" or "at" the end of a stick; all of those possible near/at locations could be deemed "proximal" to the end of that stick. Moreover, the term "proximal" can also have a meaning that relates strictly to a single object, in which the single object may have two ends, and the "distal end" is the end that is positioned somewhat farther away from a subject point (or area) of reference, and the "proximal end" is the other end, which would be positioned somewhat closer to that same subject point (or area) of reference.

It will be understood that the various components that are described and/or illustrated herein can be fabricated in various ways, including in multiple parts or as a unitary part for each of these components, without departing from the principles of the technology disclosed herein. For example, a component that is included as a recited element of a claim hereinbelow may be fabricated as a unitary part; or that component may be fabricated as a combined structure of several individual parts that are assembled together. But that "multi-part component" will still fall within the scope of the claimed, recited element for infringement purposes of claim interpretation, even if it appears that the claimed, recited element is described and illustrated herein only as a unitary structure.

All documents cited in the Background and in the Detailed Description are, in relevant part, incorporated herein by reference; the citation of any document is not to be construed as an admission that it is prior art with respect to the technology disclosed herein.

The foregoing description of a preferred embodiment has been presented for purposes of illustration and description. It is not intended to be exhaustive or to limit the technology disclosed herein to the precise form disclosed, and the technology disclosed herein may be further modified within the spirit and scope of this disclosure. Any examples described or illustrated herein are intended as non-limiting examples, and many modifications or variations of the examples, or of the preferred embodiment(s), are possible in light of the above teachings, without departing from the spirit and scope of the technology disclosed herein. The embodiment(s) was chosen and described in order to illustrate the principles of the technology disclosed herein and its practical application to thereby enable one of ordinary skill in the art to utilize the technology disclosed herein in various embodiments and with various modifications as are suited to particular uses contemplated. This application is therefore intended to cover any variations, uses, or adaptations of the technology disclosed herein using its general principles. Further, this application is intended to cover such departures from the present disclosure as come within known or customary practice in the art to which this technology disclosed herein pertains and which fall within the limits of the appended claims.

What is claimed is:

1. A robotic control system comprising:
    a robotic manipulator having at least one manipulator position sensor, and at least one manipulator actuator that controls an effort applied by at least one manipulator movable physical member;
    a robotic input controller that is manipulated by a human operator, said robotic input controller having at least one controller position sensor, at least one controller actuator that controls a position of at least one controller movable physical member proximal to a control point, and an effort sensor that measures effort applied by the human operator and which is located proximal to said control point; and
    a system controller having a processing circuit, a memory circuit including instructions executable by the processing circuit, and an interface circuit for communicating signals with
        said robotic manipulator, and
        said robotic input controller;
    wherein: said processing circuit is configured to execute:
        a position feedback algorithm for controlling said position of the at least one controller movable physical member of the robotic input controller based upon inputs from both the robotic input controller and the robotic manipulator, and
        an effort controller algorithm for controlling said effort applied by the at least one manipulator movable physical member of the robotic manipulator based upon a signal produced by said effort sensor of the robotic input controller.

2. The robotic control system of claim 1, wherein said at least one manipulator actuator comprises a first motor, and said at least one controller actuator comprises a second motor.

3. The robotic control system of claim 1, wherein said at least one manipulator position sensor comprises a first potentiometer, and said at least one controller position sensor comprises a second potentiometer.

4. The robotic control system of claim 1, wherein said effort sensor comprises at least one of:
    a force sensor;
    a torque sensor; and
    a pressure sensor.

5. The robotic control system of claim 1, wherein said human operator positions said robotic input controller in space using open loop position control, while said system controller utilizes position feedback effort control for determining movements of said robotic manipulator.

6. The robotic control system of claim 1, wherein said at least one controller movable physical member of the robotic input controller comprises a pair of robotic grippers that are rotationally hinged at two pivot axes.

7. The robotic control system of claim 1, wherein said robotic manipulator comprises a robotic gripper, in which said at least one manipulator movable physical member comprises a pair of robotic grippers that are rotationally hinged at two pivot axes.

8. The robotic control system of claim 7, wherein said robotic manipulator further comprises two position sensors and two actuating motors, thereby creating a motion-controlled machine.

9. The robotic control system of claim 1, wherein said robotic manipulator is positioned in space by an additional movable physical member having a first at least one additional degree of freedom and which incorporates an additional robotic actuator, said additional robotic actuator being controlled to a commanded position in space, as determined by said human operator, using a controller member having a second at least one degree of freedom and which incorporates at least one position sensor.

10. A robotic control system comprising:
a robotic manipulator having at least one manipulator position sensor, and at least one manipulator actuator that controls an effort applied by at least one manipulator movable physical member;
a robotic input controller that is manipulated by a human operator, said robotic input controller having at least one controller position sensor, at least one controller actuator that controls a position of at least one controller movable physical member proximal to a control point, and an effort sensor that measures effort applied by the human operator and which is located proximal to said control point; and
a system controller having a processing circuit, a memory circuit including instructions executable by the processing circuit, and an interface circuit for communicating signals with
said robotic manipulator, and
said robotic input controller;
wherein: said processing circuit is configured
to control said position of the at least one controller movable physical member of the robotic input controller based upon inputs from both the robotic input controller and the robotic manipulator,
to control said effort applied by the at least one manipulator movable physical member of the robotic manipulator based upon a signal produced by said effort sensor of the robotic input controller; and
wherein, a position of said robotic manipulator actuator is not directly controlled, and a position of said at least one manipulator movable physical member is not directly controlled.

11. The robotic control system of claim 10, wherein: a position feedback algorithm is used for controlling said position of the at least one controller movable physical member of the robotic input controller.

12. The robotic control system of claim 10, wherein: an effort controller algorithm is used for controlling said effort applied by the at least one manipulator movable physical member of the robotic manipulator.

13. A robotic control system comprising:
a robotic manipulator having at least one manipulator position sensor, and at least one manipulator actuator that controls an effort applied by at least one manipulator movable physical member;
a robotic input controller that is manipulated by a human operator, said robotic input controller having at least one controller position sensor, at least one controller actuator that controls a position of at least one controller movable physical member proximal to a control point, and an effort sensor that measures effort applied by the human operator and which is located proximal to said control point; and
a system controller having a processing circuit, a memory circuit including instructions executable by the processing circuit, and an interface circuit for communicating signals with
said robotic manipulator, and
said robotic input controller;
wherein: said processing circuit is configured to execute:
a position feedback algorithm for controlling said position of the at least one controller movable physical member of the robotic input controller wherein said position feedback algorithm comprises an Integral controller; and
an effort controller algorithm for controlling said effort applied by the at least one manipulator movable physical member of the robotic manipulator based upon a signal produced by said effort sensor of the robotic input controller.

14. The robotic control system of claim 13, wherein: said position feedback algorithm comprises a Proportional-Integral controller.

15. The robotic control system of claim 13, wherein: said position feedback algorithm comprises a Proportional-Integral-Differential controller.

* * * * *